H. P. RANKIN.

Meat-Chopper.

No. 9,182. Reissued April 27, 1880.

Witnesses:

T. R. Gantt.

Jas H. Prince

Inventor.

Hugh P. Rankin

By his atty

R. W. Smith

N. PETERS, PHOTO-LITHOGRAPHER, WASHINGTON, D. C.

UNITED STATES PATENT OFFICE.

HUGH P. RANKIN, OF ALLEGHENY CITY, PENNSYLVANIA.

MEAT-CHOPPER.

SPECIFICATION forming part of Reissued Letters Patent No. 9,182, dated April 27, 1880.

Original No. 140,950, dated July 15, 1873. Application for reissue filed February 5, 1879.

*To all whom it may concern:*

Be it known that I, HUGH P. RANKIN, of Allegheny, in the county of Allegheny and State of Pennsylvania, have invented a new and useful Improvement applicable to Meat-Choppers; and I do hereby declare the following to be a full, clear, and exact description of the same, reference being had to the accompanying drawings, forming part of this specification.

The invention consists in the crank-movement mounted in a frame capable of yielding when the crank-rods are arrested by some refractory substance to prevent disaster to the machine.

The revolving table and the cutters which constitute the characteristics of a meat-chopper are not new.

Figure 1:
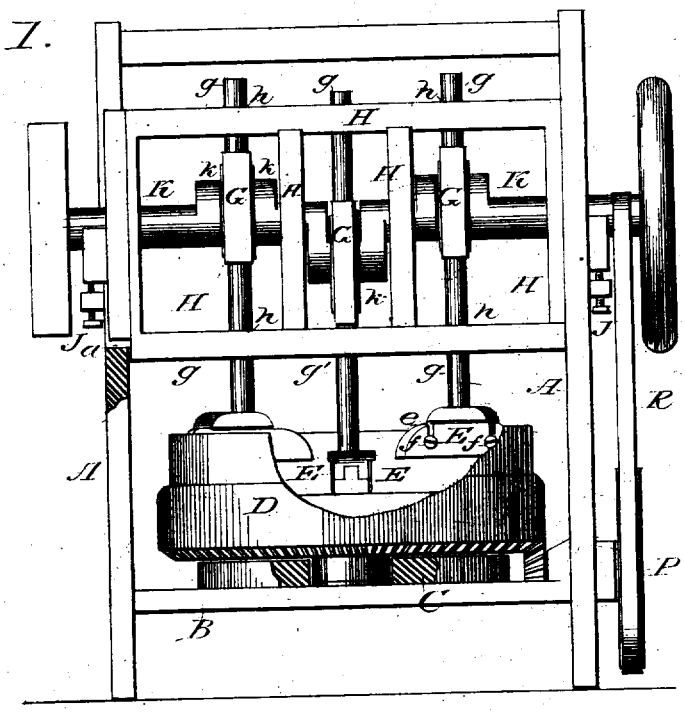
Figure 2:
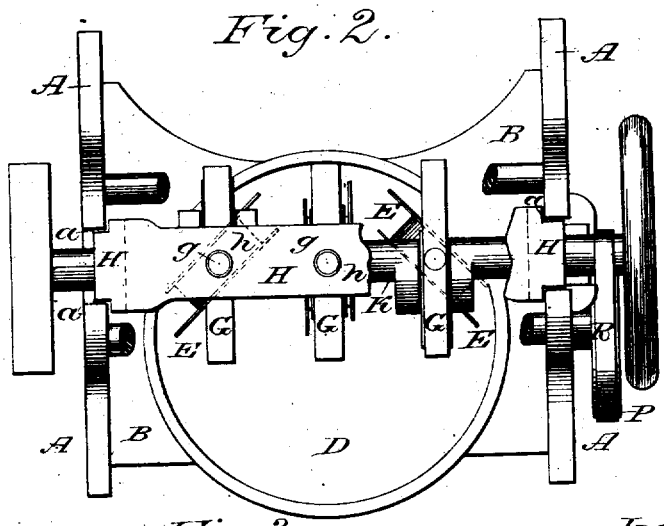
Figure 3:
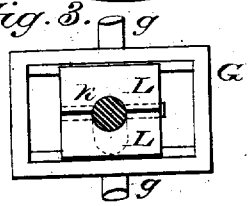

Figure 1 is a front elevation, partly broken out. Fig. 2 is a plan view. Fig. 3 is a detail view of slide.

In the drawings, A A represent the uprights of the frame, having vertical slots *a a* opening out at the top, and B is the bottom or bed plate which supports the table D.

Heretofore, in reciprocating machines of this character, there has been no adequate compensation for the untimely arrest of the crank-rod by reason of the resistance of some unusually refractory substance. To avoid the disastrous consequences which sometimes attend such arrests, I mount my driving crank-shaft K in bearings capable of sliding upward or yielding, so as to permit the revolution to continue when the crank-rod is arrested, as set forth.

To this end, H is a frame fitted to slide in the grooves *a a* in the upright frame A, and the boxes or bearings for the crank-shaft K are mounted on said frame, so as to move up and down with the same.

The crank-shaft K is provided with the cranks *k k*, and the slides L mounted thereon and moving in the yokes G as intermediates between said cranks and the crank-rods *g g'*, which are operated by said cranks. The slides L are mounted in yokes G G, to the upper and lower sides whereof the crank-rods *g g'* are attached respectively. As the cranks *k* revolve the slides L move back and forth in said yokes, and the rods are moved up and down in guides *h* in the frame H. The frame H, carrying the crank-shaft K, is retained at the bottom of its guide *a a*, or against the screws J, by gravity; and hence, if one or more of the crank-rods are suddenly arrested in their reciprocations the revolution of the crank-shaft will not be arrested, because the frame carrying the shaft will rise up far enough to permit the shaft to pass the lower dead-point, and thus damage to the machine will be avoided.

Set-screws J under the crank-shaft bearings of the frame H serve to adjust the said shaft, as shown.

In the drawings my invention is represented as applied to a meat-chopper, and D is a rotating table, which is made in the usual manner of blocks of wood, with the grain in line with the line of movement of the chopping-knives E, which are arranged in pairs on heads attached to the lower ends of the crank-rods *g'*. These knives are slotted at *e*, so that their adjustment may be changed from time to time, as may be required. The knives are secured to their heads by screws *f*.

The table D is shown as revolving in a socket-bearing in the block C, and it is actuated by a pinion at the end of shaft of the pulley P, which receives motion from the crank-shaft K by means of the elastic or extensible belt R.

I claim—

1. The combination of a bodily-movable frame H and the crank-shaft K mounted thereon with the reciprocating rod or rods *g g'*, connected with and operated by said cranks, substantially as and for the purposes set forth.

2. The combination of a bodily-movable frame H and crank-shaft K mounted thereon with the reciprocating rods *g g'*, connected with and operated by said cranks, and the rotating table to support the material under treatment, substantially as described, and for the purpose specified.

3. The combination of a bodily-movable crank-shaft, K, connected with and operating the reciprocating rod or rods *g g'*, with the rotating table D and the extensible driving-connection R, to transmit motion to said table, substantially as set forth.

4. The bodily-moving frame H, moving in guides *a a*, and the crank-shaft K, connected with and operating the rod or rods *g g'*, in combination with the adjusting-screws J, substantially as described, and for the purpose set forth.

5. A bodily-movable frame, H, bearing the crank-shaft K, rod or rods *g g'*, connected with and operating by said crank, combined with the knives E and table D, substantially as and for the purpose specified.

6. The combination of a bodily-movable frame, H, bearing the shaft K, rod or rods *g g'*, yoke G, knives E, rotary table D, and extensible belt, R, substantially as described, and for the purpose specified.

In testimony that I claim the foregoing as my invention I affix my signature in presence of two witnesses.

HUGH P. RANKIN.

Witnesses:
WM. H. STERRITT,
R. D. O. SMITH.